United States Patent [19]

Schmermund

[11] 3,976,190
[45] Aug. 24, 1976

[54] DRUM STORAGE DEVICE
[76] Inventor: Alfred Schmermund, 62 Kornerstrasse,, 5820 Gevelsberg, Germany
[22] Filed: Jan. 7, 1975
[21] Appl. No.: 539,141

[30] Foreign Application Priority Data
Jan. 22, 1974  Germany........................... 2402855

[52] U.S. Cl................................... 198/37; 198/103
[51] Int. Cl.² ........................................ B65G 43/08
[58] Field of Search.................. 198/20 R, 20 C, 21, 198/25, 34, 37, 209, 82, 211, 212, 103, 76; 214/6 TS

[56] References Cited
UNITED STATES PATENTS

| | | | |
|---|---|---|---|
| 1,521,407 | 12/1924 | Thompson | 198/209 |
| 2,014,458 | 9/1935 | Winkley | 214/6 TS |
| 2,597,900 | 5/1952 | Paynter et al. | 198/25 |
| 3,499,555 | 3/1970 | Wahle | 214/6 TS |
| 3,589,094 | 6/1971 | Pearson | 198/25 |
| 3,717,236 | 2/1973 | New | 198/25 |
| 3,871,511 | 3/1975 | Wentz et al. | 198/103 |

Primary Examiner—Evon C. Blunk
Assistant Examiner—Joseph E. Valenza
Attorney, Agent, or Firm—Sughrue, Rothwell, Mion, Zinn & Macpeak

[57] ABSTRACT

A device for storing a plurality of packages is disclosed. The device includes a plurality of serially arranged storage drums each provided with a plurality of cells which are disposed around the periphery of the respective drum and each of which is adapted to accommodate a row of such packages. The drums are each mounted to be rotatable about a respective one of spaced apart and mutually parallel axes. The device also includes drive means to synchronously rotate next adjacent drums in mutually opposite directions, guide means to guide such packages on transfer thereof between cells of next adjacent drums, a belt conveyor to convey such packages in a direction parallel to the respective axes of rotation of the drums and disposed in operative juxtaposition to the cells at the periphery of a first of the drums. Rows of such packages are transferable between the conveyor and the cells of the drums on the latter being rotated by the drive means.

7 Claims, 6 Drawing Figures

DRUM STORAGE DEVICE

BACKGROUND OF THE INVENTION

The present invention relates to a drum storage device for the temporary storing of packages, which are moved by means of a belt conveyor from a preceding machine to a succeeding machine.

Such storage reservoirs are required to enable a standstill time of the one or the other machine to be bridged over; if the succeeding machine is not operating, the storage reservoir must receive the packages supplied by the first machine, in the other case, it must deliver stored packages. To be ready operationally for both functions, the storage reservoir will generally therefore be about half-full.

Storage reservoirs of different mode of construction are known. Their construction is particularly critical when the packages to be stored are easily damaged, for example, cigarette packages of the so called "American" type, since such packages should only be subjected to very limited compressive loading and the vertical stacking of packages necessarily increases the pressure upon the lower packages in the stack.

SUMMARY OF THE INVENTION

According to the present invention there is provided a device for storing a plurality of packages comprising a seriate plurality of storage drums each mounted to be rotatable about a respective one of spaced apart axes, each drum comprising a cylindrical surface and a plurality of wall members each projecting outwardly from the cylindrical surface, the wall members defining a plurality of open cells disposed around the periphery of the respective drum, each cell being adapted to accommodate a row of such packages disposed in end-to-end relationship, drive means to synchronously rotate next adjacent ones of the drums in mutually opposite directions thereby — by interaction of such packages with the wall members — to displace such packages along a serpentine path having portions extending between the peripheries of next adjacent ones of the drums and to cause wall members of mutually facing cells of next adjacent ones of the drums to extend substantially simultaneously into the portions of the path to effect transfer of a row of such packages between said mutually facing cells, guide means to guide such packages during transfer of rows thereof between next adjacent ones of the drums, and a belt conveyor to convey said packages in a direction parallel to the axes and disposed in operative juxtaposition with the periphery of a first of the drums to successively transfer rows of such packages between the conveyor and the cells of the first drum on the latter being rotated by the drive means.

The drums may be arranged space-savingly around a drive unit and the belt conveyor may extend directly below the first drum. When the storage device is to receive packages, the passage of packages on the belt conveyor is halted, preferably by means of a controllable abutment, until a row of packages has been assembled on the conveyor below the lowermost cell of the first drum. Then the drums are rotated through a single step displacement corresponding to one cell division, thereafter the next row of packages is accumulated in front of the abutment. Thereafter ensues the next switching step and so on.

On the delivery from the drums to the belt conveyor, one proceeds oppositely; an abutment is then of course not required, yet it can be desirable to single or to brake the packages deposited closely together on the conveyor, for which purpose a controllable suction applicator device may be provided.

The transfer of packages from belt conveyor to the first drum, and between the individual drums, is effected by interaction between the packages and the longitudinally extending wall members separating the individual cells from one another. During their transfer between successive drums the packages are guided by metal guide sheets which provide guide fingers. Such guide fingers are preferably arranged to engage each individual package at the middle thereof. Expediently, each drum comprises a plurality of discs with respective gaps for the accommodation of the guide fingers therebetween. The packages may be restrained from falling out of the cells by outer cover hoods.

BRIEF DESCRIPTION OF THE DRAWINGS

An embodiment of the present invention will now be more particularly described by way of example with reference to the accompanying drawings, in which.

DESCRIPTION OF THE PREFERRED EMBODIMENT

Figure 1:
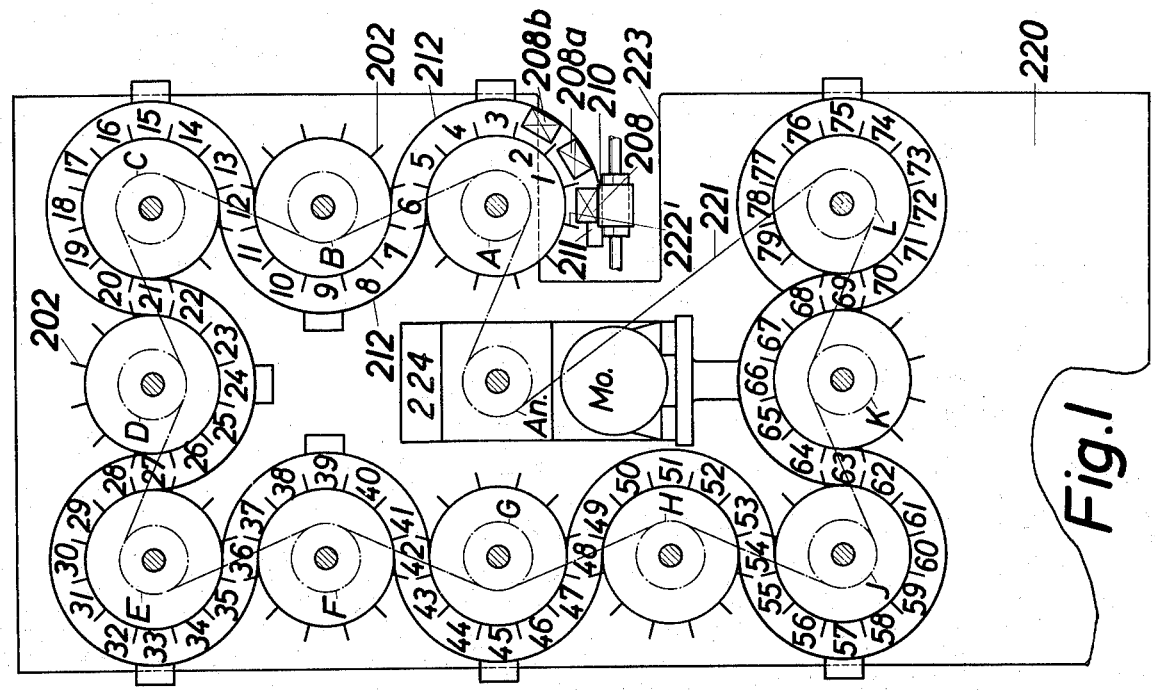
FIG. 1 shows a cross-sectional view of a drum storage device embodying the invention.

Referring now to the drawings, eleven storage drums A-L are mounted parallel to one another between two end walls 220 to be rotatable stepwise. The drive for the drums is derived from a motor Mo through a gearing An and through chains or toothed belts 221 so that the drums revolve synchronously. Drums respectively following upon one another in the drum series rotate in mutually opposite senses of rotation. The motor Mo is reversible in direction of rotation. Alternatively, the gearing An is reversible. Thus, each of the drums A-L is selectively driveable in either one of two opposite directions selected by control means represented schematically at 224 in FIG. 1.

Figure 2:
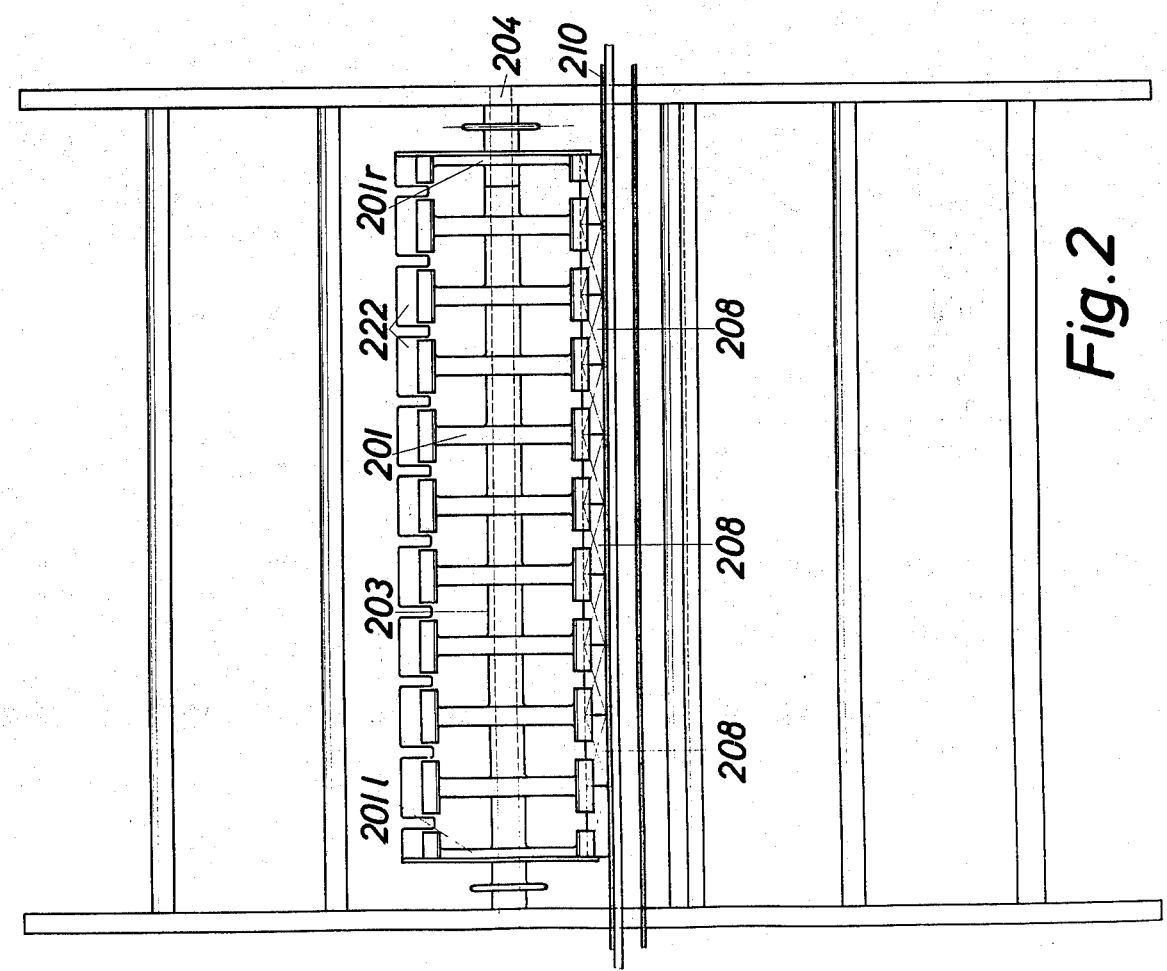
FIG. 2 represents an individual drum in co-operation with a belt conveyor.
Figure 4:
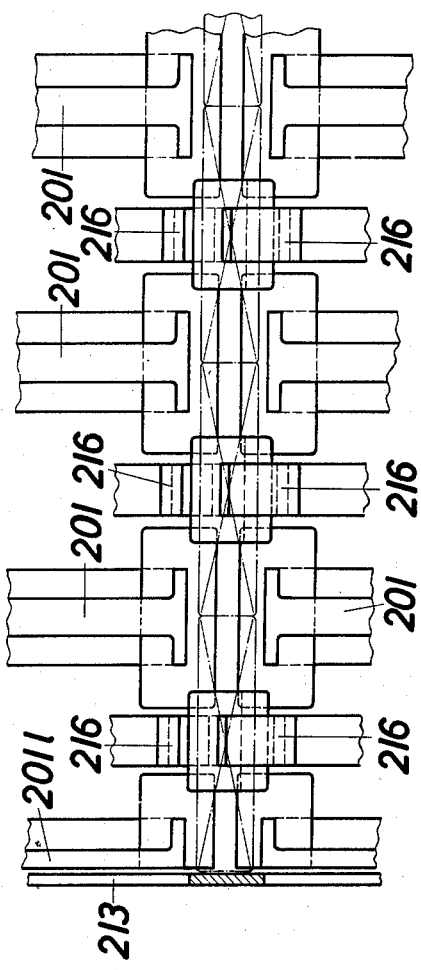
FIG. 4 shows a side view of the guide fingers shown in FIG. 3.

The drums A-L, generally designated by reference symbol 202, are constructed to be identical with one another. Stacked upon a shaft 204 are discs 201, which are again identical with one another with the exception of the two outermost discs 201L and 201R, which are each in the form of only a "half" disc. Spacer sleeves 203 can be disposed between the discs, as indicated in FIG. 2.

Figure 3:
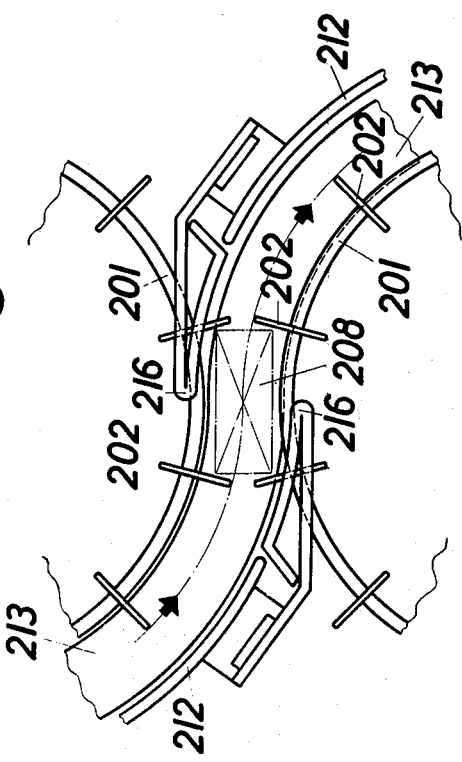
FIG. 3 illustrates the formation of transfer guide fingers to guide packages on transfer between two next adjacent drums.

Disposed at the external circumference of the discs 201 are wall members 222, which extend radially and parallel to the axis, corresponding wall members 222 of all discs of each drum being aligned with one another, so that elongated axially parallel cells are defined around the periphery of each drum. Insofar as the cells can be occupied by packages at the same moment, they are marked by 1 ... 79 in FIG. 1 and are disposed along a serpentine path. Thus, when the drums are synchronously rotated by the drive means, the packages are displaced along the serpentine path by interaction of such packages with the wall members. As shown best in FIG. 1, the serpentine path has portions which extend between the peripheries of next adjacent ones of the drums. As the drums are rotated, wall members of mutually facing cells of next adjacent ones of the drums extend substantially simultaneously (see FIG. 3) into said path portions to effect transfer of a row of such packages between the mutually facing cells of the next adjacent drums. In the case of an assumed length of the drum cells corresponding to the length of a row of thirty packages in end-to-end relationship, there results a storage capacity of 2370 packages or plus/minus 1185 packages, which with a throughput of the buffered machines of about 300 packages per minute yields a buffer time of about 3.95 minutes; this is for example a usual and adequate value for most applications such as those found, for example, in the cigarette industry or in the pharmaceutical industry.

The belt conveyor 210 runs through cut-outs 223 of the end walls 220, and is closely disposed underneath the respectively lowermost cell of the drum 202A, that the packages 208 lying on the belt conveyor project into the flight circle of the side walls 222 without however touching these when the drum is stationary and positioned as shown. Only when the buffer reservoir is put into operation, does the side wall 222′ push all packages lying within the cell from the belt conveyor in anti-clockwise sense; a stationary hood 212 attached on the outside prevents the packages from falling out of the cells loosely encompassing them. The packages in that case get into the position 208a, on the next switching step into position 208b and so on. The transfer to the drum 202B ensues after about 180° of revolution of the drum 202A.

Guide means in the form of transfer devices are constructed extremely simply. The hoods 212 extend into guide fingers 216, which engage between the discs and ensure that the packages 208 are entrained by the side walls 222 of the next following drum and pushed along their hoods. It has to be understood, that the hoods 212 can also consist of individual strips bent according to the breadth of the fingers 216, thus there need not be any massive sheet metal parts. The packages cannot fall out of the cells by being displaced in the axial direction, since the drums are provided with end flanges 213.

Figure 5:
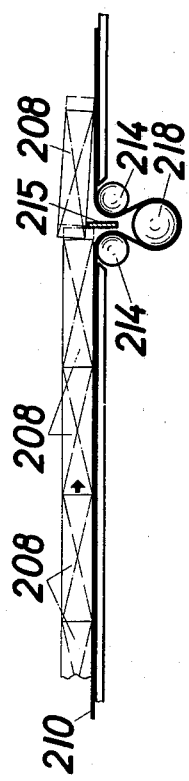
FIGS. 5 and 6 show abutment elements provided at the end of the belt conveyor for the initiation of the storage process.
Figure 6:
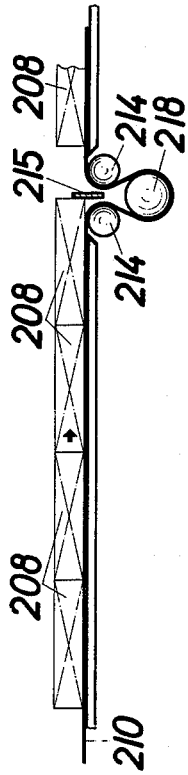

When it is indicated by an alarm signal, that the succeeding machine comes to a standstill, an abutment bar 215 is first pushed by electro-mechanical means (not shown), or by pneumatic means (not shown) into the path of the packages 208 on the belt conveyor 210. In the example of embodiment, this ensues from below (FIGS. 5 and 6), wherein the belt is guided around the mechanism by means of rollers 214 and 218. The abutment bar is approximately aligned with the flange 213, disposed downstream, of the drum 202A. The next arriving package 208 abuts against the bar 215, the next package upon this, and so on until a row corresponding to the length of the cells of the drums is accumulated. Then ensues the first rotary step of all drums, as explained above. When it is indicated, that the preceding machine comes to a standstill, the buffer reservoir thus must deliver packages; one determines, when the belt conveyor is emptied by any suitable means such as a light barrier device. The drive means of the drum reservoir then receives the order to run back by one rotary step, during which a complete row — content of a cell, in the example 30 packages — is deposited upon the conveyor belt. These deposited packages are braked by braking means in the form of a strip-shaped suction applicator device 211 (FIG. 1), apart from the first package, disposed furthest downstream, which may run on at once. After traverse of the remaining 29 packages, the next reverse rotary step ensues with deposit of the contents of the next call, and so on.

One recognises, that the conveying forces acting upon each individual package remain constant independently of the state of filling of the reservoir, thus do not increase with increasing state of filling; this is important, since in the case of modern fast running machines, the arising accelerations and retardations are very appreciable.

I claim:
1. A buffer store device for storing a plurality of packages comprising, in combination:
   a frame;
   a seriate plurality of storage drums each mounted on said frame to be rotatable about a respective one of spaced apart and mutually parallel axes, each drum comprising a cylindrical surface and a plurality of wall members each projecting outwardly from said cylindrical surface, said wall members defining a plurality of open cells disposed around the periphery of said drum, each cell being adapted to accommodate a row of said packages disposed in end-to-end relationship;
   drive means to synchronously rotate next adjacent ones of said drums in mutually opposite directions to cause said packages to interact with said wall members and thereby to be displaced along a serpentine path having portions extending between the peripheries of next adjacent ones of said drums and to cause wall members of mutually facing cells of next adjacent ones of said drums to extend substantially simultaneously into said portions of said path to effect transfer of a row of said packages between said mutually facing cells, said serpentine path terminating at the periphery of a last one of said storage drums;
   guide means to guide said packages during transfer of said rows thereof between next adjacent ones of said drums;
   control means to condition said drive means to rotate a first of said drums in a selected one of two mutually opposite directions of rotation; and
   a belt conveyor disposed in operative juxtaposition with the periphery of a first of said drums to convey said packages along a path which on said first drum being in any one of a plurality of predetermined angular positions extends through a respective one of said cells at said periphery in a direction parallel to said axes, whereby on said first drum being rotated in a first direction rows of said packages are transferred successively by interaction with said wall members from said belt conveyor to said cells of said first storage drum and are passed along said serpentine path and on said first drum being rotated in a direction opposite to said first direction rows of said packages are passed back along said serpentine path and are transferred successively from said cells to said belt conveyor.

2. A device as defined in claim 1, wherein said drive means comprise a drive unit provided with a motor and gear means, said drive unit being mounted on said frame and partially encompassed by said seriate plurality of drums.

3. A device as defined in claim 1, wherein said conveyor surface is disposed at such a distance below said wall members defining the respective lowermost cell of said first drum that when the latter is stationary said packages are conveyable by said belt conveyor along a path extending between said wall members.

4. A device as defined in claim 3, wherein a displaceably mounted abutment member is selectively displaceable into the path of said packages to arrest displacement of said packages by said belt conveyor prior to the transfer of a row of said packages to said lowermost cell of said first drum.

5. A device as defined in claim 3, wherein suction operable braking means is operatively associated with said conveyor belt, said braking means being selectively operable to arrest displacement of said packages by said conveyor belt on said row of packages being transferred to said belt from said lowermost cell of said first drum.

6. A device as defined in claim 1, wherein said guide means of each said drum comprise a plurality of substantially parallel finger guide elements, said guide elements being mutually spaced apart in a direction parallel to said axis of rotation of said drum to define an arcuate guide surface extending substantially concentrically about said axis.

7. A device as defined in claim 6, wherein each said drum comprises a plurality of axially spaced disc members, said finger elements extending into respective gaps defined between said disc members.

* * * * *